US012618479B2

(12) United States Patent
Berkovitz et al.

(10) Patent No.: US 12,618,479 B2
(45) Date of Patent: May 5, 2026

(54) VALVE ASSEMBLY USEFUL FOR CRYOGENIC APPLICATIONS

(71) Applicant: Habonim Industrial Valves & Actuators Ltd., Galil Elion (IL)

(72) Inventors: Igor Berkovitz, Karmiel (IL); Yoel Hadar, Kiryat Shmona (IL)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 11 days.

(21) Appl. No.: 18/894,026

(22) Filed: Sep. 24, 2024

(65) Prior Publication Data

US 2026/0085758 A1     Mar. 26, 2026

(51) Int. Cl.
| | |
|---|---|
| *F16K 5/06* | (2006.01) |
| *F16K 1/20* | (2006.01) |
| *F16K 3/26* | (2006.01) |
| *F16K 5/20* | (2006.01) |
| *F16K 27/06* | (2006.01) |

(52) U.S. Cl.
CPC .................. *F16K 3/26* (2013.01); *F16K 1/20* (2013.01); *F16K 1/2014* (2013.01); *F16K 1/2035* (2013.01); *F16K 1/2057* (2013.01); *F16K 5/0605* (2013.01); *F16K 5/0626* (2013.01); *F16K 5/0636* (2013.01); *F16K 5/0694* (2013.01); *F16K 5/201* (2013.01); *F16K 5/202* (2013.01); *F16K 27/067* (2013.01); *F16K 2200/501* (2021.08)

(58) Field of Classification Search
CPC ......... Y10T 137/6031; Y10T 137/6035; Y10T 137/6045; Y10T 137/6041; Y10T 137/6038; Y10T 137/6058; Y10T 137/6062; F16K 1/201; F16K 1/2014; F16K 1/2035; F16K 1/2057; F16K 5/0605; F16K 5/0626; F16K 5/0636; F16K 5/201; F16K 5/0694; F16K 5/202; F16K 27/062; F16K 27/067; F16K 2200/501
See application file for complete search history.

(56) References Cited

U.S. PATENT DOCUMENTS

| | | | | | |
|---|---|---|---|---|---|
| 2,525,831 | A | * | 10/1950 | Scherer | ................. F16K 27/062 |
| | | | | | 29/890.129 |
| 3,011,513 | A | * | 12/1961 | Heinen | ................. F16K 5/0271 |
| | | | | | 251/166 |

(Continued)

OTHER PUBLICATIONS

PCT Search and Written Opinion, PCT/IB2025/059179, Jan. 23, 2026.

*Primary Examiner* — Matthew W Jellett
(74) *Attorney, Agent, or Firm* — Dekel Patent Ltd.; David Klein

(57) ABSTRACT

A valve assembly includes a cartridge that includes a handle coupled to a stem and journaled in a bonnet coupled to an upper end of the stem, and a cage assembly coupled to a lower end of the stem and the bonnet. The cartridge is insertable through an upper end of a valve body, and the bonnet is securable to the upper end of the valve body by means of bonnet bolts. The cage assembly includes an off-set C-ball, which includes a curved face which is coupled to a rotatable C-frame and which is arranged to seal against a curved seat. Rotation of the stem rotates the off-set C-ball to permit or block flow through the cage assembly.

10 Claims, 10 Drawing Sheets

(56) References Cited

U.S. PATENT DOCUMENTS

| | | | | |
|---|---|---|---|---|
| 3,150,681 | A * | 9/1964 | Hansen | F16K 5/202 |
| | | | | 137/454.2 |
| 3,179,121 | A * | 4/1965 | Bredtschneider | F16K 5/202 |
| | | | | 251/315.08 |
| 3,214,135 | A * | 10/1965 | Hartmann | F16K 5/0689 |
| | | | | 137/246.22 |
| 3,273,852 | A * | 9/1966 | Ripert | F16K 5/202 |
| | | | | 251/188 |
| 3,537,682 | A * | 11/1970 | Priese | F16K 41/00 |
| | | | | 251/214 |
| 3,682,439 | A * | 8/1972 | Neto | F16K 5/202 |
| | | | | 251/315.12 |
| 3,795,385 | A * | 3/1974 | Westenrieder | F16K 5/202 |
| | | | | 251/315.12 |
| 3,920,036 | A * | 11/1975 | Westenrieder | F16K 5/202 |
| | | | | 251/315.08 |
| 4,535,970 | A * | 8/1985 | MacAfee | F16K 5/202 |
| | | | | 251/315.12 |
| 4,562,860 | A * | 1/1986 | Walter | F16K 5/0636 |
| | | | | 251/315.08 |
| 4,580,762 | A * | 4/1986 | Hirtz | F16K 5/202 |
| | | | | 251/188 |
| 4,632,140 | A * | 12/1986 | Harding | F16K 31/1635 |
| | | | | 251/315.12 |
| 4,917,141 | A * | 4/1990 | Brunel | F16K 31/46 |
| | | | | 251/312 |
| 4,962,911 | A * | 10/1990 | Soderberg | F16K 5/0605 |
| | | | | 251/177 |
| 5,088,687 | A * | 2/1992 | Stender | F16K 5/0668 |
| | | | | 251/315.12 |
| 5,145,150 | A * | 9/1992 | Brooks | F16K 5/204 |
| | | | | 251/188 |
| 5,333,834 | A * | 8/1994 | Soderberg | F16K 5/204 |
| | | | | 251/86 |
| 5,467,796 | A * | 11/1995 | Pettinaroli | F16K 5/204 |
| | | | | 137/238 |
| 5,799,928 | A * | 9/1998 | Siver | F16K 5/0605 |
| | | | | 251/192 |
| 6,378,842 | B1 * | 4/2002 | Frese | F16K 27/067 |
| | | | | 251/315.12 |
| 7,836,909 | B2 * | 11/2010 | Church | F16K 5/204 |
| | | | | 251/315.08 |
| 8,308,132 | B2 * | 11/2012 | Partridge | F16K 5/0678 |
| | | | | 251/304 |
| 8,740,186 | B2 * | 6/2014 | Lauridsen | F16K 11/083 |
| | | | | 251/208 |
| 9,897,223 | B1 * | 2/2018 | Roberts | F16K 25/00 |
| 11,067,179 | B2 * | 7/2021 | Shelton | F16K 27/06 |
| 2001/0045231 | A1 * | 11/2001 | Monod | F16K 27/067 |
| | | | | 137/454.2 |
| 2006/0196544 | A1 * | 9/2006 | Soderberg | F16K 5/0605 |
| | | | | 137/315.18 |
| 2025/0043871 | A1 * | 2/2025 | Lecchi | F16K 5/0689 |

* cited by examiner

VALVE ASSEMBLY USEFUL FOR CRYOGENIC APPLICATIONS

FIELD OF THE INVENTION

The present invention generally relates to ball valves, and particularly to a valve assembly which may include a vacuum-jacketed ball valve, particularly useful in cryogenic applications.

BACKGROUND OF THE INVENTION

Valves for use with extremely low temperature fluid flow, such as liquefied hydrogen or helium, must minimize the heat conduction and heat transfer from the fluid in order to minimize phase change of the cryogenic liquid, that is, to minimize evaporation of the cryogenic liquid into gas. Vacuum-jacketed ball valves are known for such applications.

An example of a prior art vacuum-jacketed ball valve is briefly described here with reference to FIGS. 1A and 1B. This example is brought merely to understand a problem with the prior art, which is discussed shortly afterwards.

As seen in FIG. 1B, the valve has an operating handle 1 connected to an elongate stem 2 that rotates a ball 3 to either open or close the valve. As seen in FIG. 1A, the ball is housed inside a valve housing 4 that has a fluid port 5. Valve housing 4 is sealingly and tightly closed by bolts 6 that help seal the ball with respect to the valve housing.

In order to be able to operate at cryogenic temperatures, the stem 2 is placed inside a vacuum-maintained jacket (vacuum jacket 7, shown in broken lines) that minimizes heat transfer in order to maintain low temperatures.

A problem with such prior art vacuum-jacketed ball valves is difficulty of maintenance or repair. In order to replace or repair the ball or seal or other part near or in the housing, one must dismantle the entire vacuum jacket 7 from the jacketed pipeline 8 to gain access to the bolts 6 so that the bolts can be removed to gain access to the inner parts of the valve housing 4. It is noted that globe valves do exist that have top entry, that is, the bonnet is removed for placing a stem through the vacuum jacket, but they have the disadvantage of low flow coefficient and complicated multiple-turn operation during closing or opening.

SUMMARY

The present invention seeks to provide a valve assembly that solves the problem of the prior art, as is described hereinbelow. The valve assembly of the present invention has a removable cartridge that includes the stem and ball as one unit that is easily mounted in or removed from a valve body which may be mounted in the outer vacuum jacket, and the vacuum jacket does not need to be removed from the pipeline. The removable cartridge is inserted in the valve body and secured by bonnet bolts at the top of the valve body. The ball that is part of the cartridge sits in a valve seat once the cartridge is installed in the outer vacuum jacket. However, just the placement of the cartridge in the valve body may not provide sufficient sealing between the ball and the valve seat in which the ball sits. The invention solves this problem with a unique sealing arrangement between the ball and the valve seat by means of conical shapes of parts and tightening forces of the bonnet bolts that ensure proper ball-to-seat and seat-to-body sealing contact even in cryogenic temperatures, as is described below.

There is provided in accordance with a non-limiting embodiment of the invention a valve assembly including a cartridge that includes a handle coupled to a stem and journaled in a bonnet coupled to an upper end of the stem, and a cage assembly coupled to a lower end of the stem and the bonnet, wherein the cartridge is insertable through an upper end of a valve body, and the bonnet is securable to the upper end of the valve body by means of bonnet bolts, and wherein the cage assembly includes an off-set C-ball, which includes a curved face which is coupled to a rotatable C-frame and which is arranged to seal against a curved seat, and wherein rotation of the stem rotates the off-set C-ball to permit or block flow through the cage assembly.

In accordance with a non-limiting embodiment of the invention an outer surface of the cage and an outer surface of the curved seat are conical, and the valve body has a conical portion, wherein a conical shape of the conical portion complements a conical shape of these outer surfaces, and tightening of the bonnet bolts to secure the bonnet to the valve body creates a preload force that forces the conical outer surface of the cage and the conical outer surface of the seat to forcefully move to a fully seated position in the conical portion, and the preload force creates a sealing preload and sealing effect between the cage and the valve body, and between the curved seat and the valve body.

In accordance with a non-limiting embodiment of the invention the valve body includes an end connection.

In accordance with a non-limiting embodiment of the invention the C-frame includes a lower bearing shaft and an upper bearing shaft which includes a stem interface member that couples with the stem.

In accordance with a non-limiting embodiment of the invention the curved seat is received in an aperture formed in a first cage half which is coupled to a second cage half to form a cage.

In accordance with a non-limiting embodiment of the invention there is an offset between a rotation center of the offset C-ball and a body center of the offset C-ball.

In accordance with a non-limiting embodiment of the invention the off-set C-ball has an orientation in which it is turned to an "approach-to-close" position, in which a cam effect leaves a gap between the curved face of the C-ball and the curved seat to allow flow through the valve.

In accordance with a non-limiting embodiment of the invention the off-set C-ball has an orientation in which it is turned to a closed position that shuts off flow through the valve, in which the curved face of the C-ball fully touches and seals against the curved seat.

In accordance with a non-limiting embodiment of the invention the off-set C-ball has an orientation in which it is turned to so the curved face of the C-ball overlaps the curved seat to create an enlarged sealing area.

BRIEF DESCRIPTION OF DRAWINGS

The present invention will be understood and appreciated more fully from the following detailed description, taken in conjunction with the drawings in which:

FIGS. 1A and 1B are simplified perspective illustrations of a prior art vacuum-jacketed ball valve.

FIGS. 2A, 2B, and 2C are simplified perspective, side-view and sectional illustrations, respectively, of a valve assembly, in accordance with a non-limiting embodiment of the invention, in which FIG. 2C is taken along lines C-C in FIG. 2B.

DETAILED DESCRIPTION

Figures 1A, 1B, 2A:
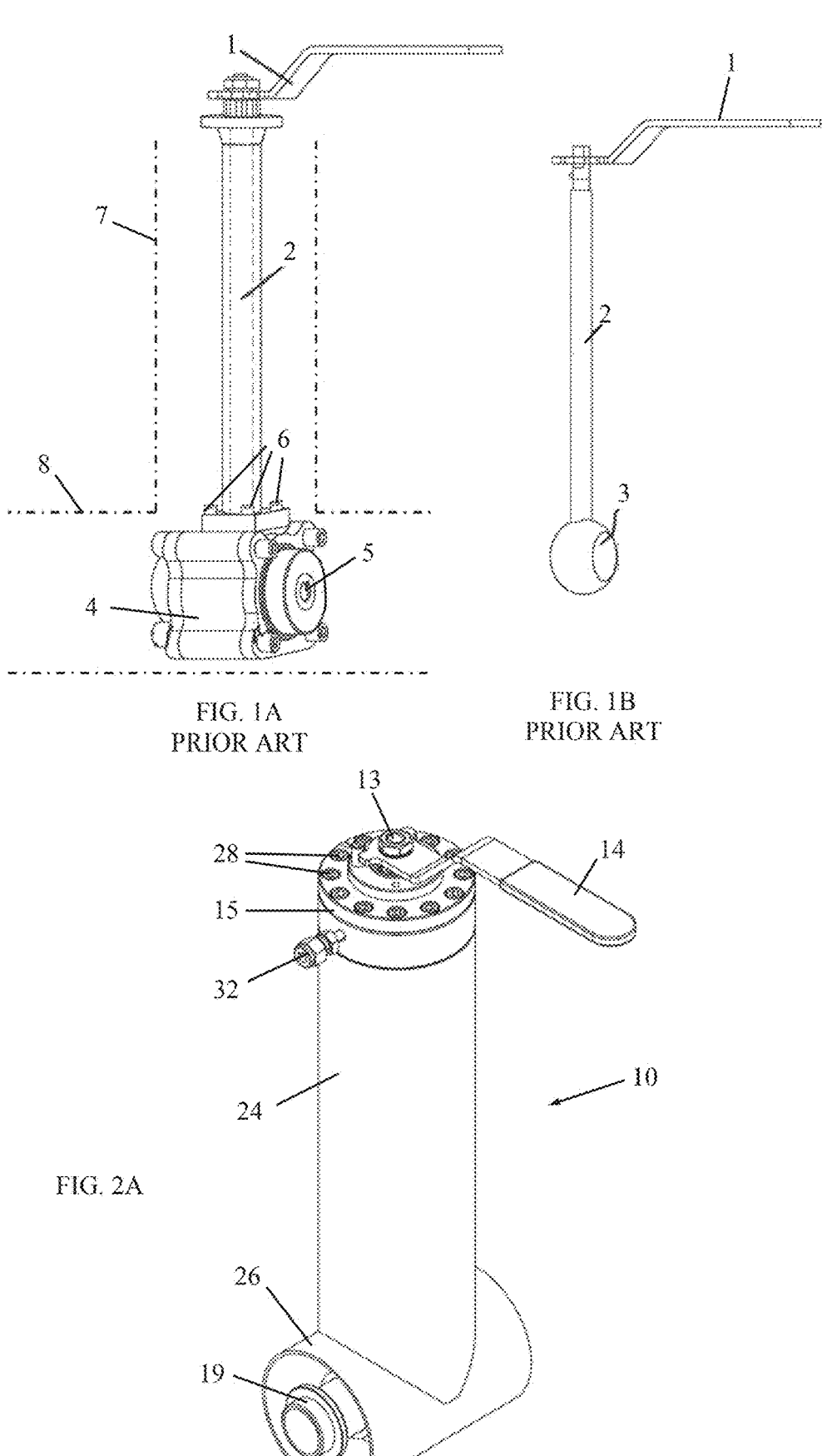
Figures 2B, 2C:
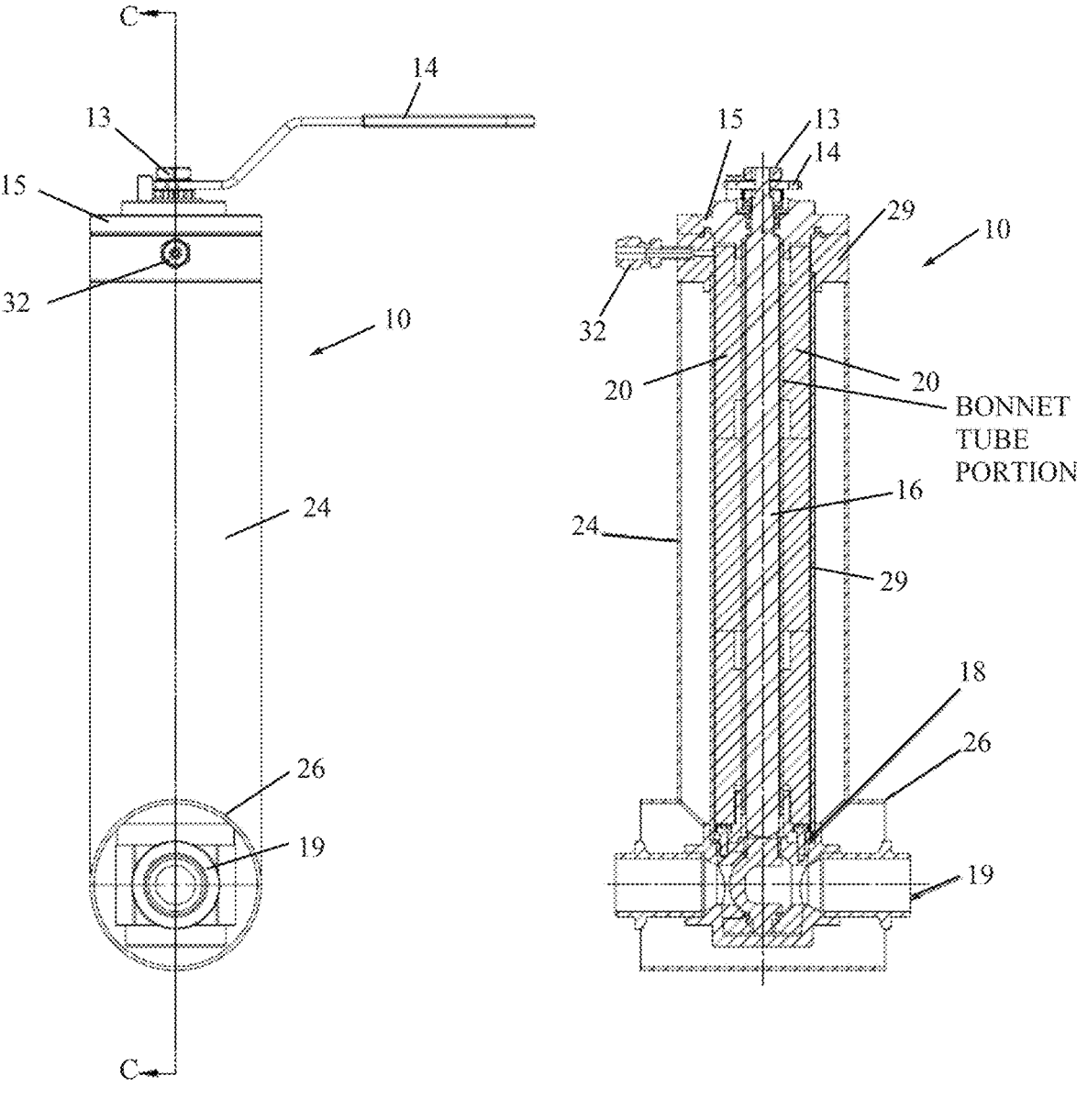
Figure 4A:
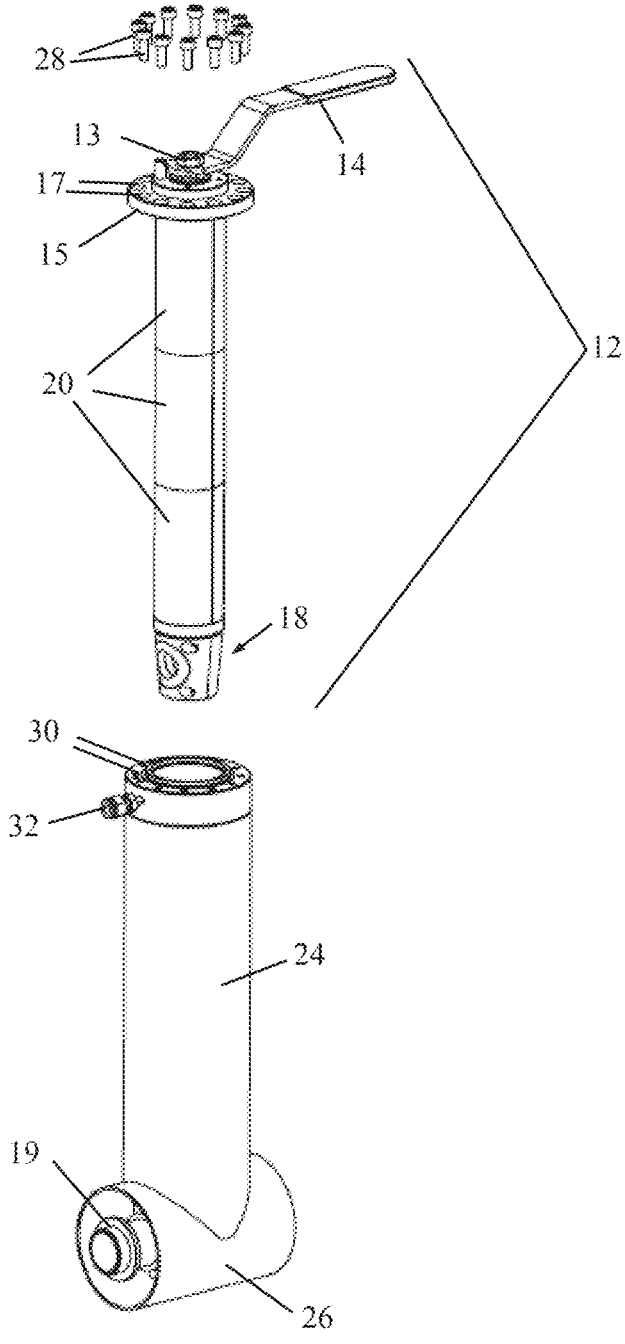
FIGS. 4A and 4B are simplified pictorial and exploded illustrations, respectively, of a cartridge of the valve assembly before insertion into the vacuum jacket.
Figure 4B:
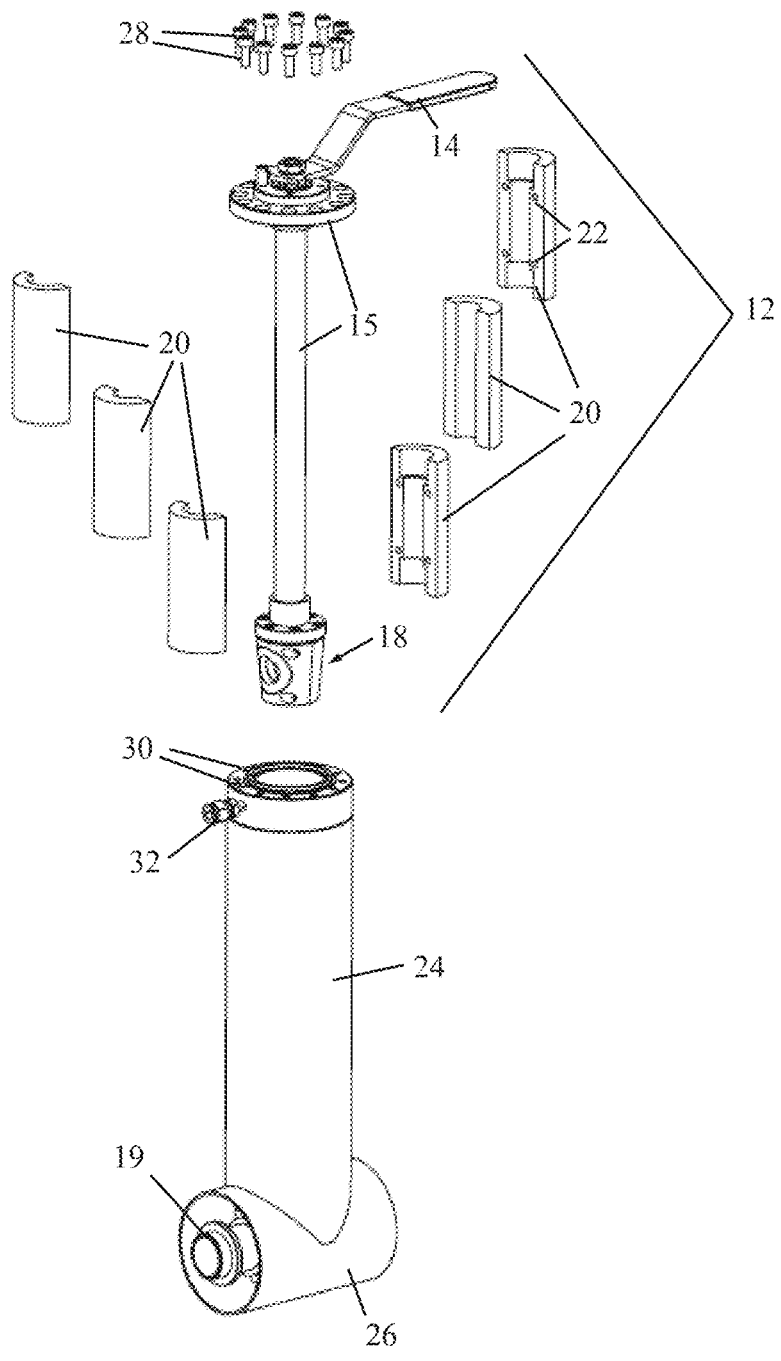

Reference is now made to FIGS. 2A, 2B, and 2C, and to FIGS. 4A and 4B, which illustrate a valve assembly 10, in accordance with a non-limiting embodiment of the invention.

Figure 3A:
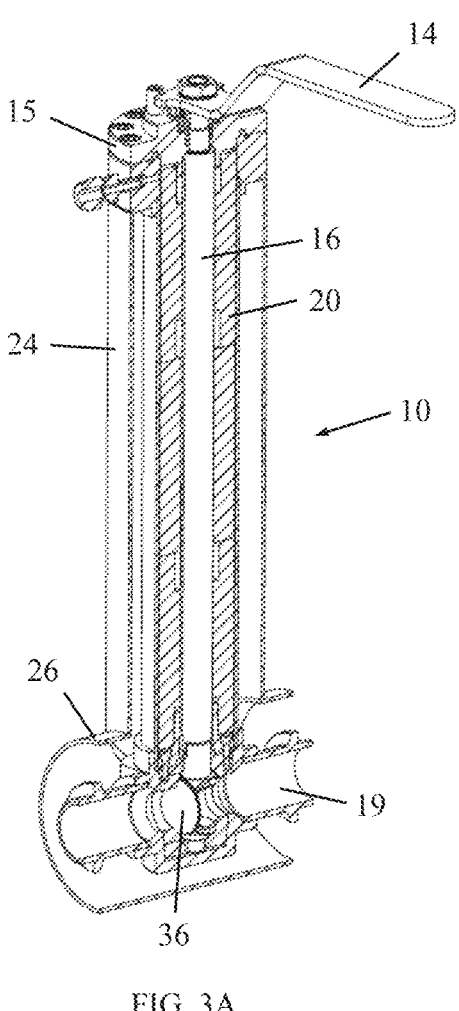
FIGS. 3A and 3B are simplified cutaway illustrations of the valve assembly in closed and open positions, respectively.
Figure 3B:
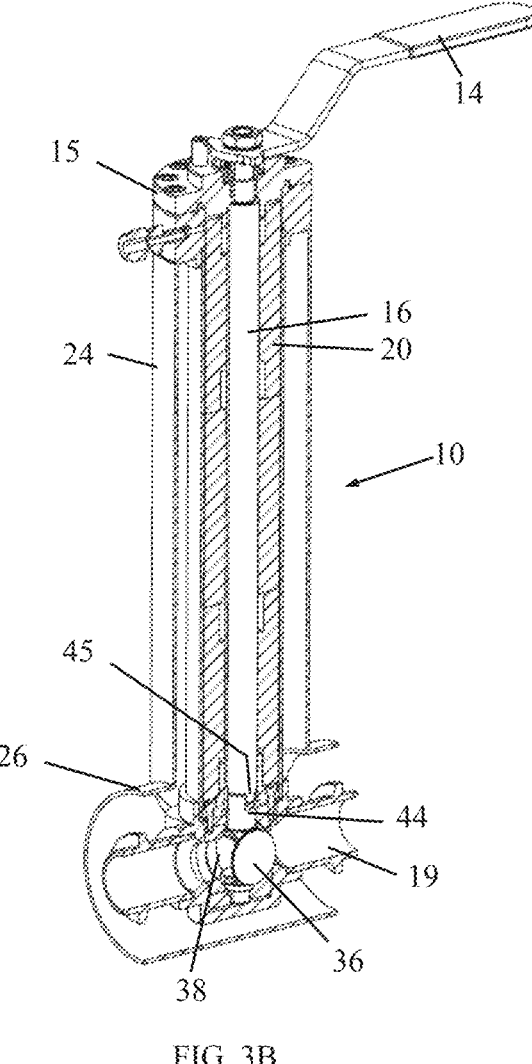

The valve assembly 10 may include a cartridge 12 (seen in FIG. 4A and in section in FIG. 2C), which includes a turning handle 14 coupled to a stem 16 (seen in FIG. 3B). The cartridge 12 includes a bonnet 15, which may include a top portion from which extends a bonnet tube portion. Stem 16 is located in the bonnet tube portion of bonnet 15. The lower end of stem 16 ("lower" in the sense of the drawings) is coupled to a cage assembly 18, whose parts are described below with reference to FIG. 5.

As seen in FIG. 3B, handle 14 may be coupled to stem 16 by a mechanical fastener 13, such as a nut tightened on a threaded rod. Stem 16 is journaled (mounted for rotation) in the bonnet 15, which is provided with mounting holes 17 circumferentially spaced from one another (also seen in FIG. 4A).

Figures 6, 6A:
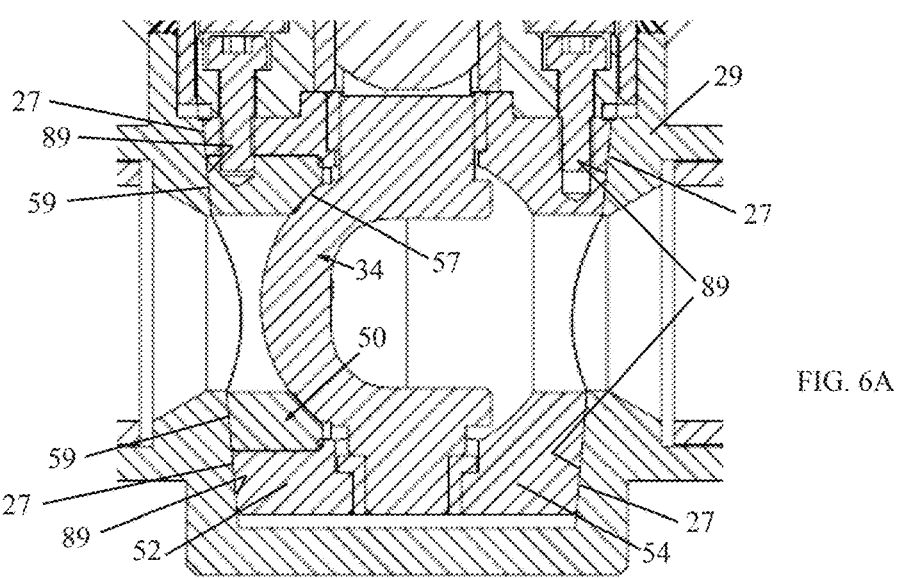
FIG. 6 is a sectional illustration of the valve assembly, in accordance with a non-limiting embodiment of the invention.
FIG. 6A is an enlarged view of a portion of FIG. 6.

As seen in FIG. 6, the cartridge is inserted in a valve body 29, which at a lower end thereof, may include end connections 19, which may be coupled to the rest of the valve body 29, such as by welding or mechanical fasteners and the like. As seen in FIG. 6, bonnet 15 may be secured to valve body 29 by means of mechanical fasteners, referred to as bonnet bolts 28, which pass through mounting holes 17 and thread into threaded holes 30 located at the top face of valve body 29.

As seen in FIGS. 2C and 4B, one or more filler sleeves 20 may be placed around the bonnet tube portion of bonnet 15 to fill the radial gap between the bonnet tube portion of bonnet 15 and the inner diameter of valve body 29. The filler sleeves 20 may be full 360° cylindrical sleeves, or as shown in the non-limiting illustrated embodiment, may be semi-cylindrical sleeves (180°) or any other at least partially-cylindrical sleeve (meaning either 360° or less than 360°). When using at least partially-cylindrical sleeves that are less than 360°, the sleeves may be joined to each other by male-female connectors 22 (FIG. 4B) or by any other suitable method. The filler sleeves 20 help prevent any liquid phase of the cryogenic fluid from entering gaps or spaces between the bonnet 15 and the valve body 29. The filler sleeves 20 may be made of any suitable material, such as but not limited to, polytetrafluoroethylene (PTFE) and many others. It is noted that instead of filler sleeves, O-rings or other seals may be used to prevent any liquid phase of the cryogenic fluid from entering gaps or spaces between the bonnet 15 and the valve body 29.

Valve body 29 may be provided with a purge port 32 for connection to a purge line or a pressure monitoring device (not shown).

As seen in FIGS. 2C and 6, the cartridge may be top-loaded into the valve body 29. The assembly of the cartridge in the valve body is referred to as the valve assembly 10. As seen in FIGS. 2C, 3A, 3B and 6, the valve body 29 may be mounted in a vacuum jacket 24. The vacuum jacket 24 may be coupled to jacketed pipeline 26, such as by welding or mechanical fasteners and the like. The valve assembly 10 of the invention can be provided without the vacuum jacket and its jacketed pipeline, and the vacuum jacket and its jacketed pipeline may be provided separately or made at the installation site. Alternatively, valve assembly 10 of the invention can be provided pre-assembled with the vacuum jacket and jacketed pipeline, if so desired.

Figure 5:
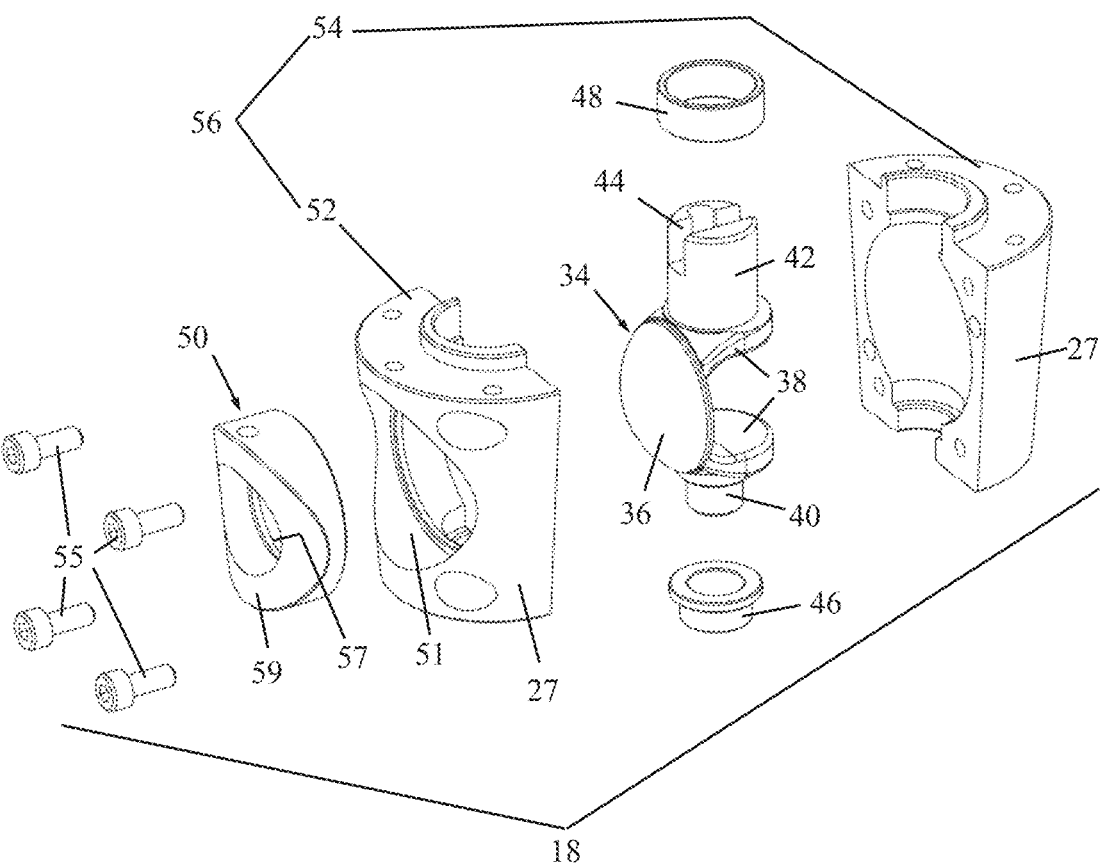
FIG. 5 is an exploded illustration of a valve assembly that includes an off-set (eccentric) C-ball, curved seat and cage of the valve assembly, in accordance with a non-limiting embodiment of the invention.

Reference is now made to FIG. 5, which is an exploded illustration of cage assembly 18. The cage assembly 18 may include an off-set (eccentric) C-ball 34, which includes a curved face 36 (e.g., partially spherical) coupled to a C-frame 38, from which extends a lower bearing shaft 40 and an upper bearing shaft 42 which includes a stem interface member 44, such as a groove configured to receive a tongue or other protrusion 45 (seen in FIG. 3B) of stem 16. The lower bearing shaft 40 may be journaled in a bushing or other bearing member 46, and upper bearing shaft 42 may be journaled in a bushing or other bearing member 48. The curved face 36 of C-ball 34 is arranged to seal against a seat 50 which has an inner curved C-ball interface surface 57 that is partially spherical to complement the shape of curved face 36 (seen partially in FIG. 5 and seen best in FIG. 6). Seat 50 is received in an aperture 51 formed in a first cage half 52 which may be coupled to a second cage half 54 by mechanical fasteners 55. The first cage half 52 and second cage half 54 form a cage 56 of the ball valve. The outer surface 27 of cage 56 is conical. The outer surface 59 of seat 50 is also conical. The importance of being conical is explained below with reference to FIG. 6 and FIG. 6A.

Reference is now made to FIGS. 3A and 3B, which illustrate the vacuum-jacketed ball valve 10 in closed and open positions, respectively. In the closed position, the curved face 36 of the C-ball faces the end connection 19 to block flow therethrough. In the open position, the curved face 36 of the C-ball faces away from the end connection 19 to allow flow through C-frame 38. Typically, but not necessarily, there is a quarter turn (90°) between the open and closed positions, but as will be explained below, there may be enhanced sealing by turning more than 90°.

Reference is now made to FIG. 6 (and FIG. 6A, which is an enlarged view of a lower portion of FIG. 6), which illustrates the valve assembly 10 with the cartridge installed in the valve body 29. As noted above, the outer surfaces 27 of first cage half 52 and second cage half 54, and the outer surface 59 of seat 50 are conical. The cartridge is designed to fit into a conical portion 89 of valve body 29. The conical shape of conical portion 89 complements the conical shape of outer surfaces 27 and 59. When the cartridge is top-inserted into valve body 29, the conical outer surfaces 27 of first cage half 52 and second cage half 54 and the conical outer surface 59 of seat 50 are received in conical portion 89 but are not yet at their final fully seated positions. The tightening of bonnet bolts 28 to secure bonnet 15 to valve body 29 creates a force in the direction of arrows 23 that forces the conical outer surfaces 27 of first cage half 52 and second cage half 54 and the conical outer surface 59 of seat 50 to move downwards and inwards (in the sense of FIG. 6) until they reach their final fully seated positions in conical portion 89. This preload force creates a sealing preload and sealing effect between the cage halves 52/54 and the valve body 29, and between seat 50 and the valve body 29, which is fluid tight to prevent any liquid phase of the cryogenic fluid from entering gaps or spaces between seat 50 or the cage halves 52/54 and the valve body 29.

Figure 7:
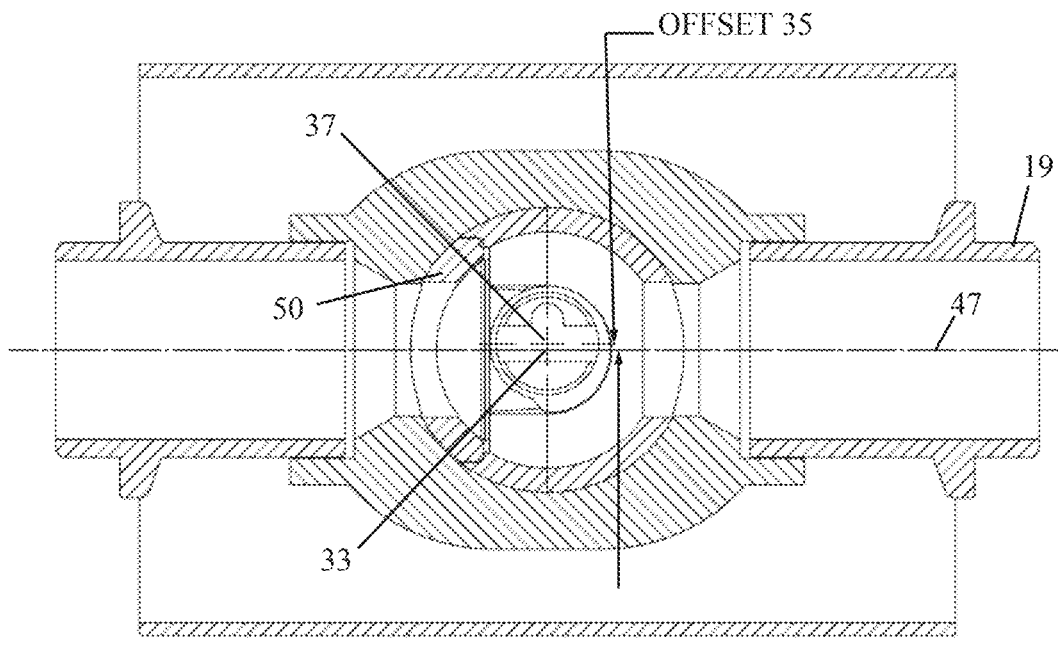
FIG. 7 is a sectional illustration of the off-set (eccentric) C-ball, showing the offset feature.

Reference is now made to FIG. 7, which illustrates the offset 35 between the C-ball rotation center 37 and the C-ball body center 33, which is on the longitudinal axis 47 of the flow through the valve.

Figure 8A:
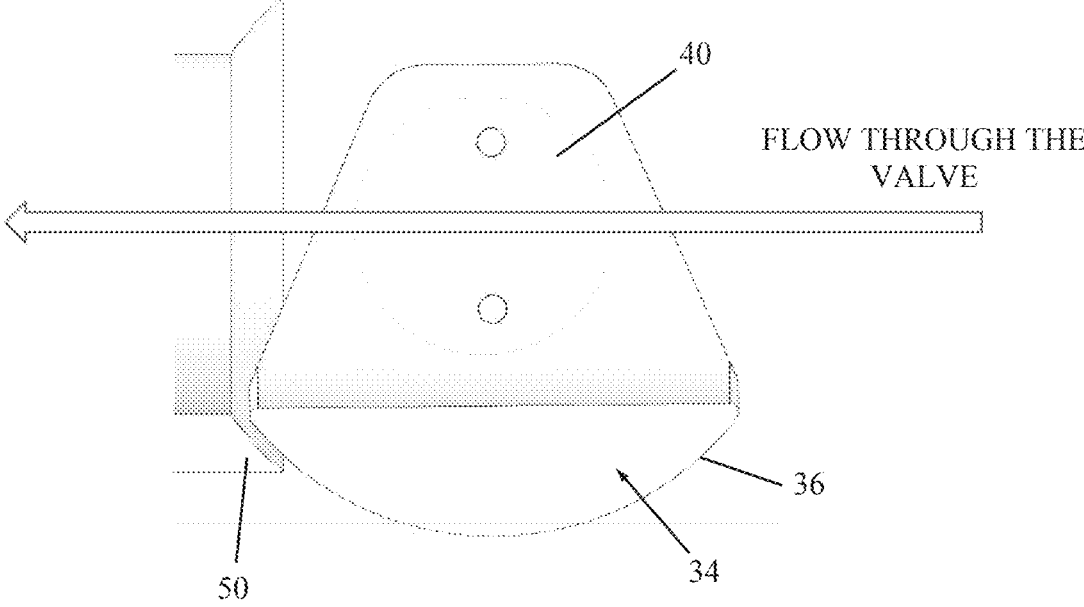
FIG. 8A is a simplified illustration of the off-set (eccentric) C-ball in a fully open position that allows full flow through the valve.

Reference is now made to FIG. 8A, which shows the off-set C-ball 34 in a fully open position that allows full flow through the valve.

Figure 8B:
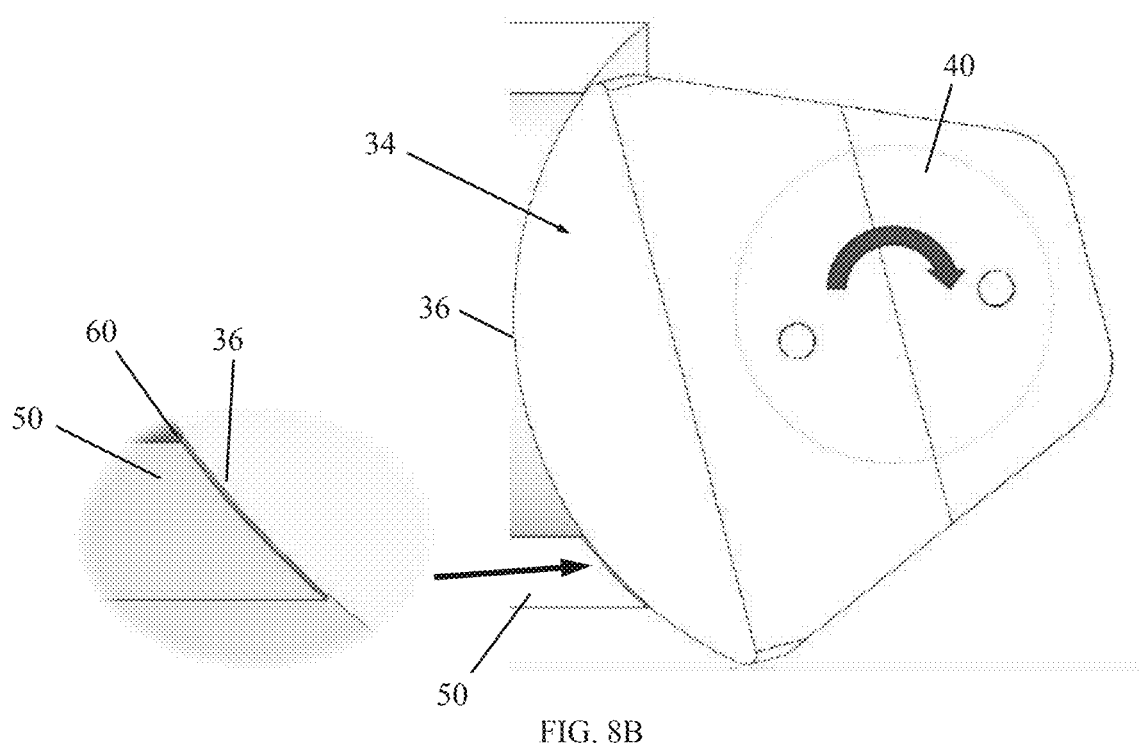
FIG. 8B is a simplified illustration of the off-set (eccentric) C-ball after being turned to an "approach-to-close" position, in which a cam effect at first leaves a gap. The cam effect has low torque and no friction, with very little wear of parts.

Reference is now made to FIG. 8B, which shows the off-set C-ball 34 after being turned to an "approach-to-close" position, in which a cam effect at first leaves a gap 60 between curved face 36 of the C-ball 34 and curved seat 50 to allow flow through the valve. The cam effect has low torque and no friction, with very little wear of parts.

Figure 8C:
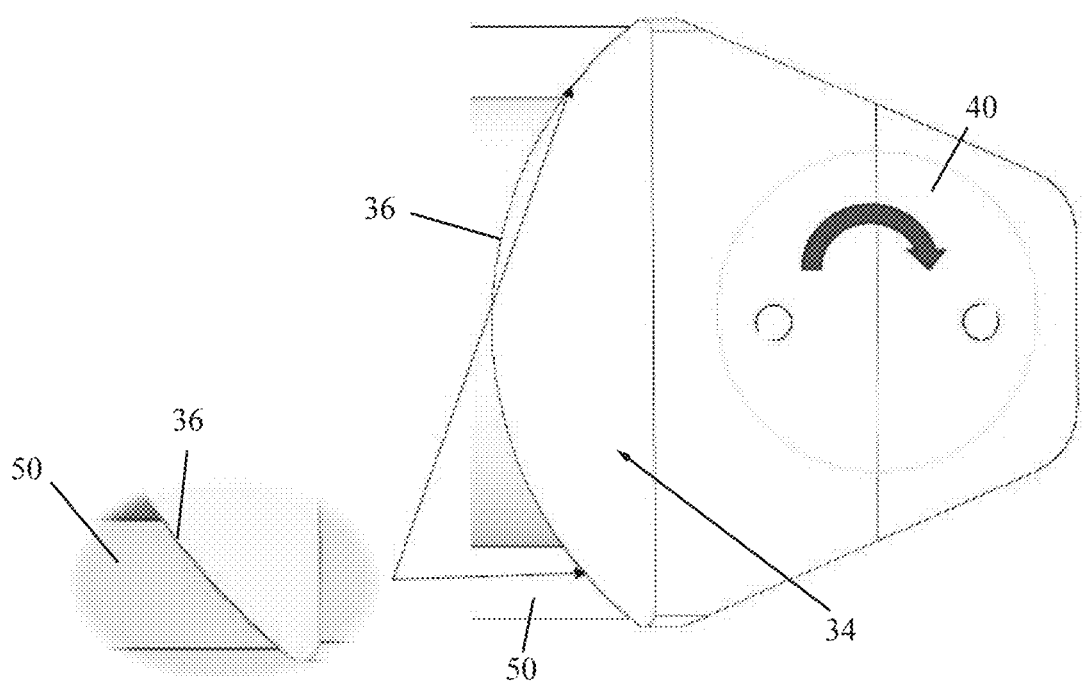
FIG. 8C is a simplified illustration of the off-set (eccentric) C-ball after being further turned to a closed position that shuts off flow through the valve. The C-ball fully touches and seals against the curved seat. This closed position mechanically assures shutoff, yet does not require any springs or dynamic seals.

Reference is now made to FIG. 8C, which shows the off-set C-ball 34 after being further turned to a closed position that shuts off flow through the valve. The curved face 36 of C-ball 34 fully touches and seals against the curved seat 50. This closed position mechanically assures shutoff, yet does not require any springs or dynamic seals.

Figure 8D:
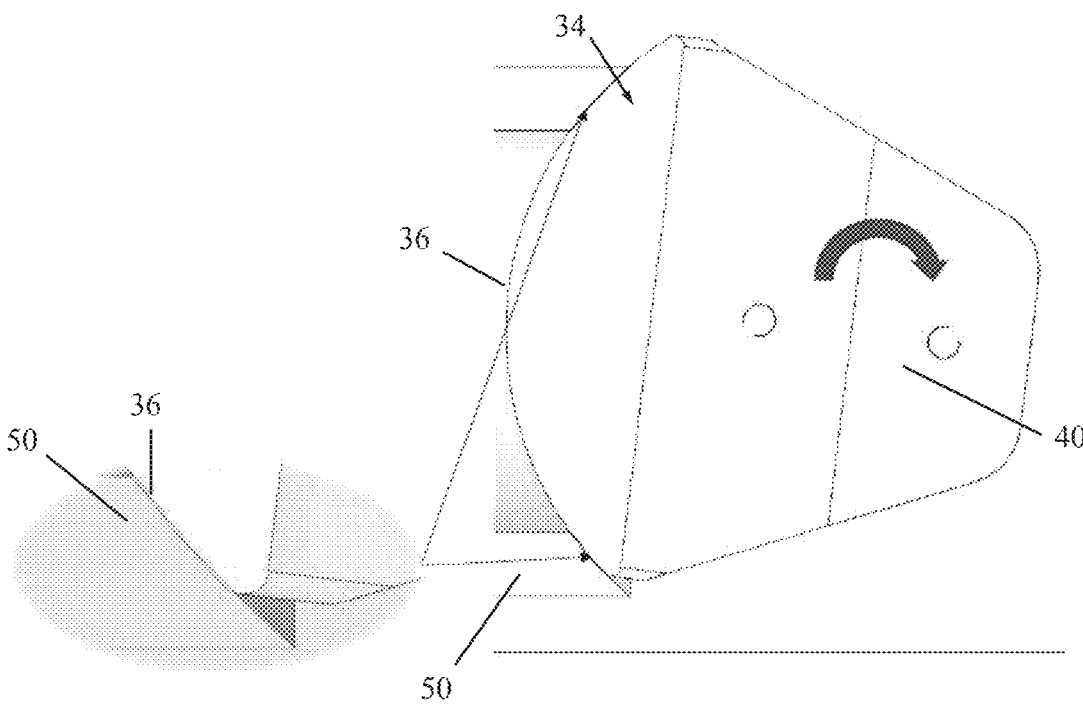
FIG. 8D is a simplified illustration of the off-set (eccentric) C-ball after being even further turned so the C-ball overlaps the curved seat to create an even better tightness by what is called the increased torque sealing effect. The torque to create this additional sealing is transmitted to the seat through the stem. Thus, the increase in the stem torque causes better sealing.

Reference is now made to FIG. 8D, which shows the off-set C-ball 34 after being even further turned so the curved face 36 of C-ball 34 overlaps the curved seat 50 to create an even better tightness by what is called the increased torque sealing effect. The torque to create this additional sealing is transmitted to the seat through the stem. Thus, the increase in the stem torque causes better sealing.

What is claimed is:
1. A valve assembly comprising:
   a cartridge that comprises a handle coupled to a stem and journaled in a bonnet coupled to an upper end of said stem, and a cage assembly coupled to a lower end of said stem and said bonnet;

wherein said cartridge is insertable through an upper end of a valve body, and said bonnet is securable to the upper end of said valve body by means of bonnet bolts; and
   wherein said cage assembly comprises an off-set C-ball, which comprises a curved face which is coupled to a rotatable C-frame and which is arranged to seal against a curved seat which is located in an aperture formed in a cage, and wherein rotation of said stem rotates said off-set C-ball to permit or block flow through said cage assembly, and wherein an outer surface of said cage and an outer surface of said curved seat are conical, and said valve body has a conical portion, wherein a conical shape of said conical portion complements a conical shape of said outer surfaces of said cage and a conical shape of said outer surface of said curved seat, and tightening of said bonnet bolts to secure said bonnet to said valve body creates a preload force that forces said conical outer surface of id cage and said conical outer surface of said seat to forcefully move to a fully position in said conical portion, and said preload force creates a sealing preload and sealing effect between said curved seat and said valve body.

2. The valve assembly according to claim 1, wherein a bonnet tube portion extends downwards from said bonnet, and said bonnet tube portion, said cage and said curved seat are coupled to each other with one or more fasters.

3. The valve assembly according to claim 1, wherein said valve body comprises an end connection.

4. The valve assembly according to claim 1, wherein said rotatable C-frame comprises a lower bearing shaft and an upper bearing shaft which comprises a stem interface member that couples with said stem.

5. The valve assembly according to claim 1, wherein said curved seat is received in an aperture formed in a first cage half which is coupled to a second cage half to form said cage.

6. The valve assembly according to claim 1, wherein there is an offset between a rotation center of said offset C-ball and a body center of said offset C-ball.

7. The valve assembly according to claim 1, wherein said off-set C-ball has an orientation in which it is turned to an "approach-to-close" position, in which a cam effect leaves a gap between said curved face of said C-ball and said curved seat to allow flow through the valve assembly.

8. The valve assembly according to claim 1, wherein said off-set C-ball has an orientation in which it is turned to a closed position that shuts off flow through the valve assembly, in which said curved face of said C-ball fully touches and seals against said curved seat.

9. The valve assembly according to claim 1, wherein said off-set C-ball has an orientation in which it is turned so that said curved face of said C-ball overlaps said curved seat to create an increased torque sealing effect.

10. The valve assembly according to claim 1, wherein said cage comprises an annular rim and said curved seat is wedged between said valve body and said annular rim of said cage.

* * * * *